Sept. 20, 1960   A. T. GILBERT   2,953,381
GAME
Filed Aug. 8, 1958

INVENTOR.
AUGUSTUS T. GILBERT

BY HIS ATTORNEYS.
HARRIS, KIECH, FOSTER & HARRIS

United States Patent Office 2,953,381
Patented Sept. 20, 1960

2,953,381

GAME

Augustus T. Gilbert, 1148 Chestnut Ave.,
Long Beach, Calif.

Filed Aug. 8, 1958, Ser. No. 754,086

5 Claims. (Cl. 273—161)

This invention relates to a game and, in particular, to a game for selecting indicia which may be used in a plurality of ways.

It is an object of the invention to provide a game wherein the selection of indicia is carried out by vibration of the game equipment, which vibration is produced by body tremors of the operator who manually grasps one piece of the game equipment. A further object of the invention is to provide a game wherein a pointer is traversed across a board having a plurality of indicia thereon with the pointer being mounted on a ring which is vibrated by the operator who manually positions the ring above the board.

It is an object of the invention to provide such a game wherein the indicia on the board may comprise numbers, letters, colors, musical tones, astrological and zodiacal terms and symbols, fortune predictions and answers to questions, and the like. A further object of the invention is to provide such a board wherein the indicia may be arranged in contiguous segmented bands such that different sets of indicia may be correlated. A further object of the invention is to provide such a game wherein the pointer may have two legs for resting on different indicia, particularly indicia in different bands, providing an interrelation between the bands.

It is an object of the invention to provide a game, including a game board having a plurality of indicia thereon, a ring which is manually positionable above the board, and a pointer for carrying on the ring and positioning over the board in contact therewith, the pointer being traversable over the board due to vibration of the ring produced by body tremors of the operator supporting the ring.

Other objects, advantages, features and results of the invention will more fully appear in the course of the following description. The drawing merely shows and the description merely describes a preferred embodiment of the present invention which is given by way of illustration or example.

The game of the invention includes a game board 10, a ring 11 and a pointer 12.

Figure 1:
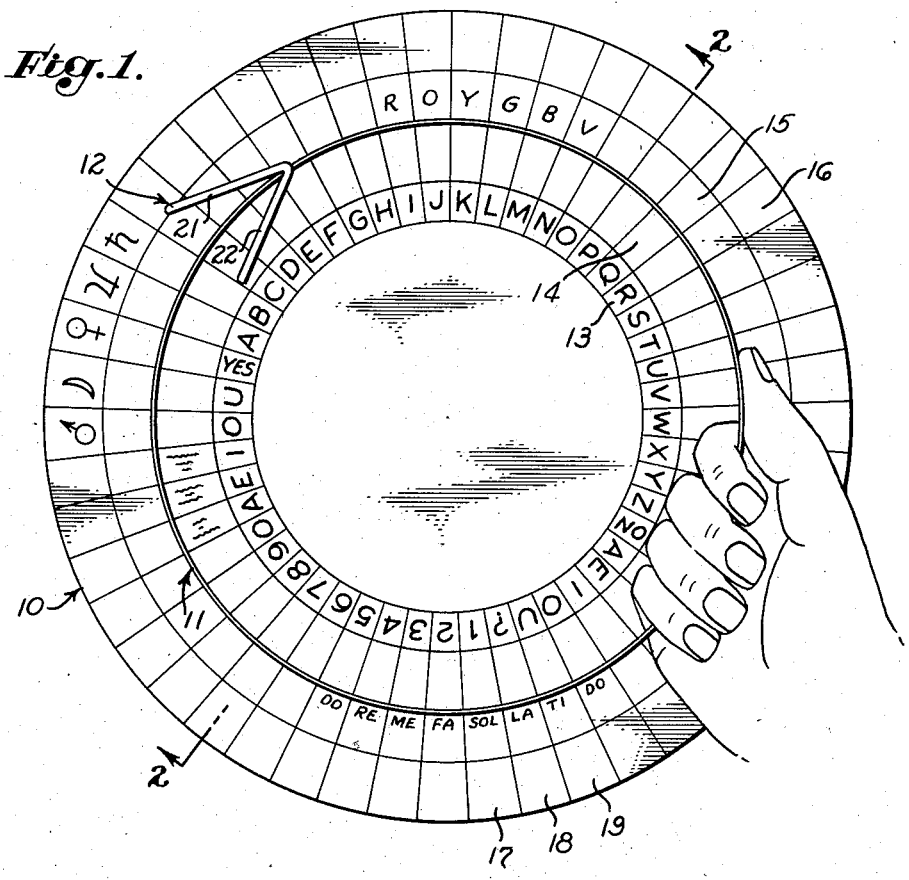
Fig. 1 is a plan view of the game in progress.
Figure 2:
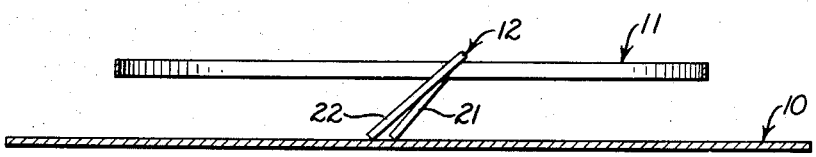
Fig. 2 is a sectional view taken along the line 2—2 of Fig. 1.

The game board 10 is a flat piece of wood, card or the like having a plurality of indicia printed thereon. While the indicia may take various forms, a preferred design is shown in Fig. 1. A plurality of concentric bands, 13, 14, 15, 16, are each divided into segments, such as the segments 17, 18, 19 of the band 16. Various types of information may be placed in each of the segments, such as the letters and numbers of the band 13. Other indicia may include the astrological symbols of the band 16 and the musical tones of the band 15. The segments may have various colors such as indicated by the letters R, O, Y, etc. in the band 15, standing for the colors red, orange, yellow, etc. The indicium may also include fortune predictions and answers to questions, as indicated by the text lines in the band 14.

The ring 11 may have the circular form shown in Fig. 1 or may be oval or some other suitable shape. While the particular shape and material of the ring is not critical to the invention, it is preferred to form the ring of a flat strip of resilient material such as brass, steel, or plastic. A typical ring may be of half-hard brass strip 3/8" wide by 1/32" thick formed into a circle 10" in diameter.

The pointer 12 may be a V-shaped unit having legs 21, 22 which rest on the board 10 with the apex of the V resting on the ring 11. It should be noted that a pointer with a single leg can be used although the bifurcated pointer is preferred in that the two legs may contact two different bands of indicia, permitting correlation between two different selected segments. Such two selected segments need not be in radial alignment since the pointer may be skewed providing a wide range of interrelations.

In use, the ring 11 is grasped by the operator, preferably by one hand as shown in Fig. 1, and the ring is positioned above the game board 10 substantially parallel thereto. The pointer 12 is mounted on the ring with its leg or legs resting on the game board. Vibration or oscillation of the ring will cause the pointer to move over the board, ordinarily in the direction of the intersection or junction of the legs of the pointer. While the ring may be intentionally vibrated by the operator, it will be found that it is extremely difficult, if not impossible, to maintain the ring still when it is manually positioned over the board due to inherent tremors of the operator's body.

With the pointer in any arbitrary position, the ring is raised to the position shown in the drawing and held there for a particular period of time, and then the ring is rested on the board. The particular segment on which the end of a particular leg or the segments on which the ends of both legs lie constitute the selected indicia. The indicia are noted and the operation is repeated. The number of operations is dependent upon the particular mode of interpretation being used. For example, it may be desired to obtain a sequence of three astrological symbols for interpretation according to certain astrological conventions. Then the sequence of operation described above would be repeated three times, using only a single leg of the pointer as an indicator to provide a symbol for each operation. Alternatively, the game may be used to compose a tune by repeating the operation a number of times and noting the particular tone indicated after each operation.

The length of time which the ring is held above the board may be an arbitrary unit of time such as 10 seconds, or may be determined by other factors. In order to keep the interest in the game, the pointer should stop definitely at irregular intervals, which intervals are not under the conscious control of the operator. One typical example for determining the time is for the operator to take three regular breaths and rest the ring on the board on expelling the third breath. Thus, it is seen that the method of playing the game may be varied, depending upon the type of information desired and the use to which the selected indicia will be put, as well as to meet the fancy of the operator.

Although an exemplary embodiment of the invention has been disclosed and described, it will be understood that other applications of the invention are possible and that the embodiment disclosed may be subjected to various changes, modifications and substitutions without necessarily departing from the spirit of the invention.

I claim as my invention:

1. In a game wherein a pointer is moved over a plurality of indicia in response to tremors of the operator's hand, the combination of: a game board having an endless band with a plurality of indicia thereon; a bifurcated pointer having a pair of legs; and an endless ring for engaging and supporting said pointer over said board with said legs resting on said board, said ring being manually supported and positionable above said board so that vibration of said ring moves said pointer along said band.

2. In a game, the combination of: a game board having a plurality of endless, segmented bands thereon; a bifurcated pointer having a pair of legs; and an endless ring for supporting said pointer, said ring being manually positionable above said board with said pointer mounted thereon such that said legs rest on different bands on said board and said pointer traverses said board in response to tremors of the operator's hand.

3. In a game wherein a pointer is moved over a plurality of indicia in response to tremors of the operator's hand, the combination of: a game board having a plurality of indicia thereon in an endless band; an endless ring manually positionable above said board; and a pointer having means for engaging said ring in pointer supporting relationship and means for contacting said board for movement around said ring along said bands in indicating particular indicium.

4. In a game, the combination of: a game board having a plurality of concentrically disposed segmented bands; an endless ring of resilient material; and a pointer having a pair of legs joined at an intersection for straddling said ring and contacting said board with said ring manually held above said board, with said ring supporting said pointer and traversing said pointer along said band by vibrations of said ring transmitted to said pointer at said intersection.

5. In a game, the combination of: a game board having a plurality of indicia thereon; a ring comprising a closed loop and manually positionable above said board; and a pointer having means for engaging said ring in pointer supporting relationship and having means for contacting said board for indicating particular indicium whereby the body tremors of the operator manually supporting said ring produce continuous movement of said pointer around said ring.

References Cited in the file of this patent

UNITED STATES PATENTS

| | | |
|---|---|---|
| 1,514,260 | Rees | Nov. 4, 1924 |
| 1,545,971 | Pajeau | July 14, 1925 |
| 1,587,018 | Manahan | June 1, 1926 |
| 2,392,547 | Plebanek | Jan. 8, 1946 |